United States Patent
Walker et al.

(10) Patent No.: US 7,512,150 B2
(45) Date of Patent: Mar. 31, 2009

(54) 10 GBE LAN SIGNAL MAPPING TO OTU2 SIGNAL

(75) Inventors: Timothy P. Walker, Boxford, MA (US); Jay Quirk, Kanata (CA)

(73) Assignee: Applied Micro Circuits Corporation, San Diego, CA (US)

( * ) Notice: Subject to any disclaimer, the term of this patent is extended or adjusted under 35 U.S.C. 154(b) by 988 days.

(21) Appl. No.: 10/395,843

(22) Filed: Mar. 24, 2003

(65) Prior Publication Data

US 2004/0202198 A1    Oct. 14, 2004

(51) Int. Cl.
*H04J 3/16* (2006.01)
(52) U.S. Cl. .................. 370/466; 370/474; 370/476
(58) Field of Classification Search ................. 370/465, 370/466, 470–476
See application file for complete search history.

(56) References Cited

U.S. PATENT DOCUMENTS

| | | | | |
|---|---|---|---|---|
| 6,029,202 | A | 2/2000 | Frazier et al. | 709/232 |
| 6,292,517 | B1 | 9/2001 | Jeffress et al. | 375/287 |
| 6,477,200 | B1 | 11/2002 | Agazzi et al. | 375/233 |
| 2002/0027929 | A1* | 3/2002 | Eaves | 370/505 |
| 2002/0083190 | A1* | 6/2002 | Kamiya et al. | 709/236 |
| 2003/0048813 | A1* | 3/2003 | Lahav et al. | 370/537 |
| 2004/0062277 | A1* | 4/2004 | Flavin et al. | 370/474 |
| 2004/0114638 | A1* | 6/2004 | Matsuura et al. | 370/537 |
| 2004/0156325 | A1* | 8/2004 | Perkins et al. | 370/299 |
| 2004/0156390 | A1* | 8/2004 | Prasad et al. | 370/466 |
| 2005/0163162 | A1* | 7/2005 | Lanzone et al. | 370/471 |

* cited by examiner

*Primary Examiner*—Hassan Kizou
*Assistant Examiner*—Bo Hui A Zhu
(74) *Attorney, Agent, or Firm*—Weingarten, Schurgin, Gagnebin & Lebovici LLP

(57) ABSTRACT

A high-capacity digital communications system and method of transporting 10 GbE LAN packets between user devices over an OTN network that allows the packets to be transported in a manner that is transparent to the destination device(s) on the network. The digital communications system includes an OTN network, and at least one source device and at least one destination device connected to the network via respective 10 Gbase-R interfaces. The system transports 10 GbE LAN data packets over the OTN network by performing decoding on the packets to recover the preamble and variable length data contained in each packet, removing the IPG between successive packets in the stream, encapsulating the packets including the respective preambles and data, and mapping the encapsulated packets to the overhead and payload areas of ODUk frames. The packets are then transported over the OTN network from the source device to the destination device.

9 Claims, 5 Drawing Sheets

10 GBE LAN SIGNAL MAPPING TO OTU2 SIGNAL

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to high-capacity digital communications systems, and more specifically to a digital communications system and method of transporting 10 Gbit/s Ethernet LAN data packets over an optical transport network.

In recent years, Optical Transport Networks (OTN networks) have been increasingly employed for transporting 10 Gbit/s Ethernet (GbE) LAN (10 Gbase-R) data packets between Ethernet client devices. A conventional technique of transporting 10 GbE LAN data packets from a source device to a destination device over an OTN network includes terminating the Ethernet LAN physical layer, extracting the 10 GbE LAN packets, encapsulating the packets using the Generic Framing Procedure (GFP), and mapping the GFP encapsulated packets to the payload of one or more ODUk frames for subsequent transport over the network.

One drawback of the above-described technique of transporting 10 GbE LAN packets over an OTN network is that the Ethernet signal generally cannot be transported in the ODUk payload as a Continuous Bit Rate (CBR) signal. This is because the data rate of the 10 GbE LAN signal is typically higher than the payload rate of the ODUk frame. For example, the data rate of the 10 GbE LAN signal is equal to 10.0000±100 ppm Gbit/s, and the data rate of an OPU2 payload is equal to 9.9953±20 ppm Gbit/s. For this reason, flow control is usually employed to assure that no packets are lost while transporting the 10 GbE LAN signal between the source and destination devices on the network. However, requiring the use of flow control techniques precludes transporting the 10 GbE LAN packets over the OTN network in a manner that is transparent to the destination device(s).

Another known technique of transporting 10 GbE LAN packets over an OTN network includes removing the preamble from each 10 GbE LAN packet, GFP encapsulating the packets, and mapping the GFP encapsulated packets to the payload of ODUk frames. This technique typically comprises the removal of the 8-byte preamble from each Ethernet packet, and the addition of an 8-byte GFP header to the packet. However, some client applications employ the preamble when mapping client application data to the Ethernet packets. Removing the preamble from each Ethernet packet may therefore lead to the loss of client data. Because this second technique also typically results in a 10 GbE LAN data rate that is higher than the ODUk payload rate, flow control is normally required to avoid any further data loss, thereby making it difficult to transport the 10 GbE LAN signal in a transparent manner.

It would therefore be desirable to have an improved digital communications system and method of transporting 10 GbE LAN data packets over an OTN network. Such a digital communications system would avoid the drawbacks of the above-described conventional communications techniques.

BRIEF SUMMARY OF THE INVENTION

In accordance with the present invention, a high-capacity digital communications system and method of transporting 10 Gbit/s Ethernet (GbE) LAN data packets between Ethernet LAN user devices over an Optical Transport Network (OTN network) is provided that allows the 10 GbE LAN packets to be transported in a manner that is transparent to the destination device(s) on the network. The presently disclosed Ethernet LAN packet transporting technique achieves such transparency by removing the Inter-Packet Gap (IPG) between successive 10 GbE LAN packets in the data stream, and mapping encapsulated packets to at least a portion of the overhead and payload areas of one or more ODUk frames for subsequent transport over the network.

In one embodiment, the digital communications system includes at least one OTN network, and at least one source device and at least one destination device connected to the OTN network via respective 10 GbE LAN (10 Gbase-R) interfaces. In the presently disclosed embodiment, the digital communications system transports 10 GbE LAN data packets over the OTN network by performing 64 B/66 B decoding on the packets to recover the preamble and variable length data contained in each packet, removing the IPG between successive packets in the data stream, encapsulating the packets including the respective preambles and data using the Generic Framing Procedure (GFP), and mapping the GFP encapsulated packets to at least a portion of the overhead and payload areas of one or more ODUk frames. In the preferred embodiment, the packets are mapped to 7 bytes of the OPU2 overhead area, and to the bytes of the OPU2 payload area. The packets are then transported over the OTN network from the source device to the destination device.

By removing the IPG between successive Ethernet LAN packets and mapping the GFP encapsulated packets to the overhead and payload areas of the ODUk frames, 10 GbE LAN packets can be transported over the OTN network in a transparent manner while preserving the Ethernet preamble.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A high-capacity digital communications system and method of transporting 10 Gbit/s Ethernet (GbE) LAN data packets over an Optical Transport Network (OTN network) is disclosed that allows the Ethernet packets to be transported in a manner that is transparent to destination device(s) on the network. The presently disclosed digital communications system is configured to transport high speed Ethernet LAN packets by removing the Inter-Packet Gap (IPG) between successive packets in the data stream, and to map encapsulated packets to at least a portion of the overhead and payload areas of one or more ODUk frames.

Figure 1:
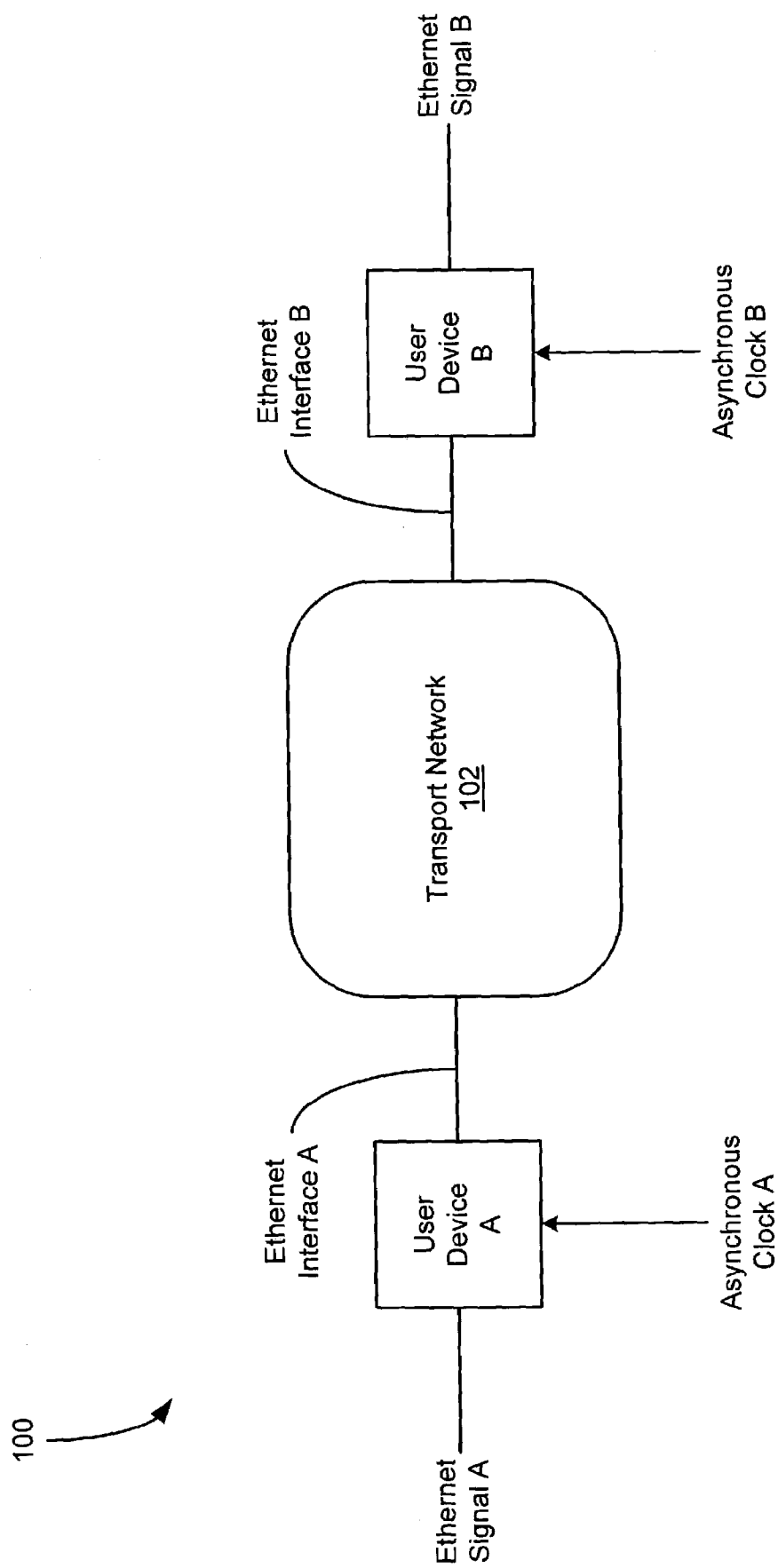
FIG. 1 is a block diagram of a high-capacity digital communications system according to the present invention.

FIG. 1 depicts an illustrative embodiment of a digital communications system 100, in accordance with the present invention. In the illustrated embodiment, the digital communications system 100 comprises a transport network 102, and a plurality of user devices A-B connected to the network 102 via respective Ethernet physical interfaces A-B. For example, the transport network 102 may comprise one or more communications networks conforming to the Optical Transport Hierarchy (OTH) standard, one or more communications networks conforming to the Synchronous Digital Hierarchy (SDH) standard, or any other suitable communications network. Further, the respective Ethernet physical interfaces A-B may comprise a 10 Mbits/s Ethernet interface (10Base), a 100 Mbits/s Ethernet interface (100Base), a 1 GbE interface (1000Base), a 10 GbE LAN (10 Gbase-R) or WAN (10 Gbase-W) interface, or any other suitable Ethernet physical interface defined by IEEE standard 802.3. In the presently disclosed embodiment, the transport network 102 comprises an OTN network conforming to the OTH standard, and each Ethernet interface A-B comprises an IEEE 802.3 defined 10 GbE LAN interface (10 Gbase-R) for purposes of illustration. The OTH standard specified in the CCITT Recommendations G.709 Version 2, January 2003; IEEE standard 802.3ae, Draft 5.0, May 2002; and, IEEE standard 802.3ah, Draft 1.3, January 2003, are incorporated herein by reference.

It should be understood that the user device A is connected to a first Ethernet Local Area Network (LAN; not shown), and the user device B is connected to a second Ethernet LAN (not shown). Accordingly, the user device A is configured to receive/transmit an Ethernet signal A over the first Ethernet LAN, and the user device B is configured to receive/transmit an Ethernet signal B over the second Ethernet LAN.

It is also noted that the respective Ethernet interface rates for the first and second Ethernet LANs may be different. Accordingly, the user device A is configured to receive an asynchronous clock signal A, and the user device B is configured to receive an asynchronous clock signal B, in which the frequency of clock A may or may not be equal to the frequency of clock B. It is appreciated that the user device B may alternatively receive a clock signal derived from a suitable clock carried over the OTN network 102. In the presently disclosed embodiment, the Ethernet interfaces A-B comprise 10 GbE LAN interfaces. The respective rates for the Ethernet interfaces A-B are therefore within the range 10.0000±100 ppm Gbit/s.

As described above, the digital communications system 100 allows 10 GbE LAN packets to be transported over the OTN network 102 in a manner that is transparent to the user devices A-B on the network. In the preferred embodiment, the digital communications system 100 is configured to transfer substantially all of the information contained in the 10 GbE LAN signal between the user devices A-B over the OTN network 102.

Figure 2:
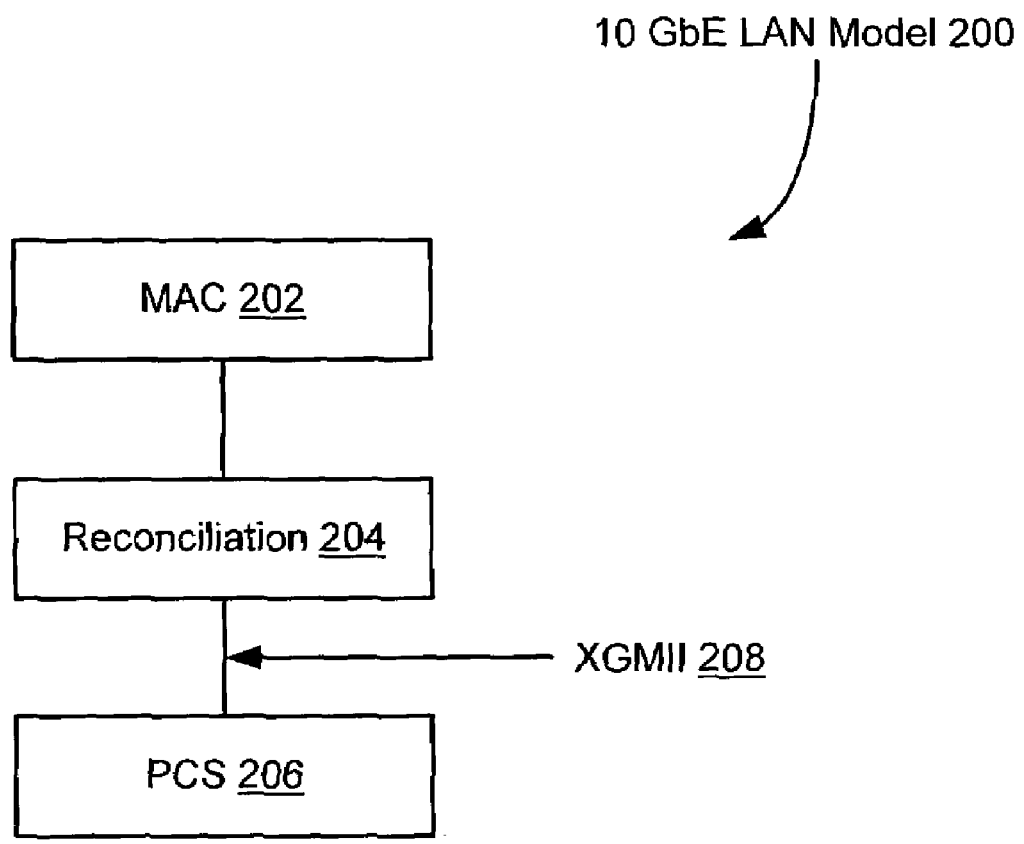
FIG. 2 is a block diagram of a model representation of a 10 Gbit/s Ethernet LAN signal transported by the digital communications system of FIG. 1.

FIG. 2 depicts a model representation of a 10 GbE LAN signal that may be transported by the digital communications system 100 (see FIG. 1). As shown in FIG. 2, the 10 GbE LAN signal comprises a plurality of sub-layers, i.e., a Media Access Control (MAC) sub-layer 202, a Reconciliation Sub-layer (RS) 204, and a Physical Coding Sub-layer (PCS) 206, and a 10 Gbit Media Independent Interface (XGMII) 208. As described above, each one of the Ethernet interfaces A-B (see FIG. 1) comprises a 10 GbE LAN interface (10 Gbase-R), which employs 64 B/66 B encoding. The PCS 206 is configured to perform the required 64 B/66 B decoding/encoding, and is used for signaling via sequence-ordered sets, as described in detail in IEEE standard 802.3ae. As indicated in clause 46.3.4 of IEEE 802.3ae, for 10 Gbase-R, only one kind of sequence-ordered set is defined. There are only two sets defined. However, the general case is four octets. The digital communications system 100 (see FIG. 1) is configured to transfer information corresponding to at least the two state. In the preferred embodiment, the digital communications system 100 transfers information corresponding to the actual four octets of the sequence-ordered set between the user devices A-B.

The XGMII 208 (see FIG. 2) data stream comprises the following components:

$$\text{<inter-frame><preamble><sfd><data><efd>}, \quad (1)$$

in which the "inter-frame" is the inter-frame period, the "preamble" is the packet preamble, "sfd" is the start of frame delimiter, "data" is the packet data, and "efd" is the end of frame delimiter, as defined in the IEEE standard 802.3ae. IEEE 802.3ae indicates that the inter-frame period on the XGMII transmit/receive path is an interval during which no frame data activity occurs. Accordingly, in the preferred embodiment, the digital communications system 100 does not transfer the inter-frame period between the user devices A-B.

IEEE 802.3ae further indicates that the start of frame delimiter (sfd) and the end of frame delimiter (efd) comprise internally generated signals. Accordingly, in the preferred embodiment, the digital communications system 100 does not transfer the sfd and the efd between the user devices A-B.

IEEE 802.3ae defines the packet preamble as a fixed pattern. However, it has been proposed that the packet preamble may be employed to convey predetermined types of information. For example, the IEEE standard 802.3ah indicates that the point-to-point emulation sub-layer makes an underlying P2 MP network appear as a collection of point-to-point links to higher protocol layers (at and above the MAC client). The point-to-point emulation sub-layer achieves this by pre-pending a Logical Link Identification (LLID) to the beginning of each packet, replacing two octets of the preamble. Accordingly, in the preferred embodiment, the digital communications system 100 transfers the packet preamble between the user devices A-B.

As described above, the digital communications system 100 transfers substantially all of the information contained in the 10 GbE LAN signal between the user devices A-B over the OTN network 102. In the preferred embodiment, the digital communications system 100 is configured to transfer at least the packet preamble, the packet data, and the information corresponding to the sequence-ordered sets, and to drop bits corresponding to 64 B/66 B encoding and the inter-frame period.

Figure 3:
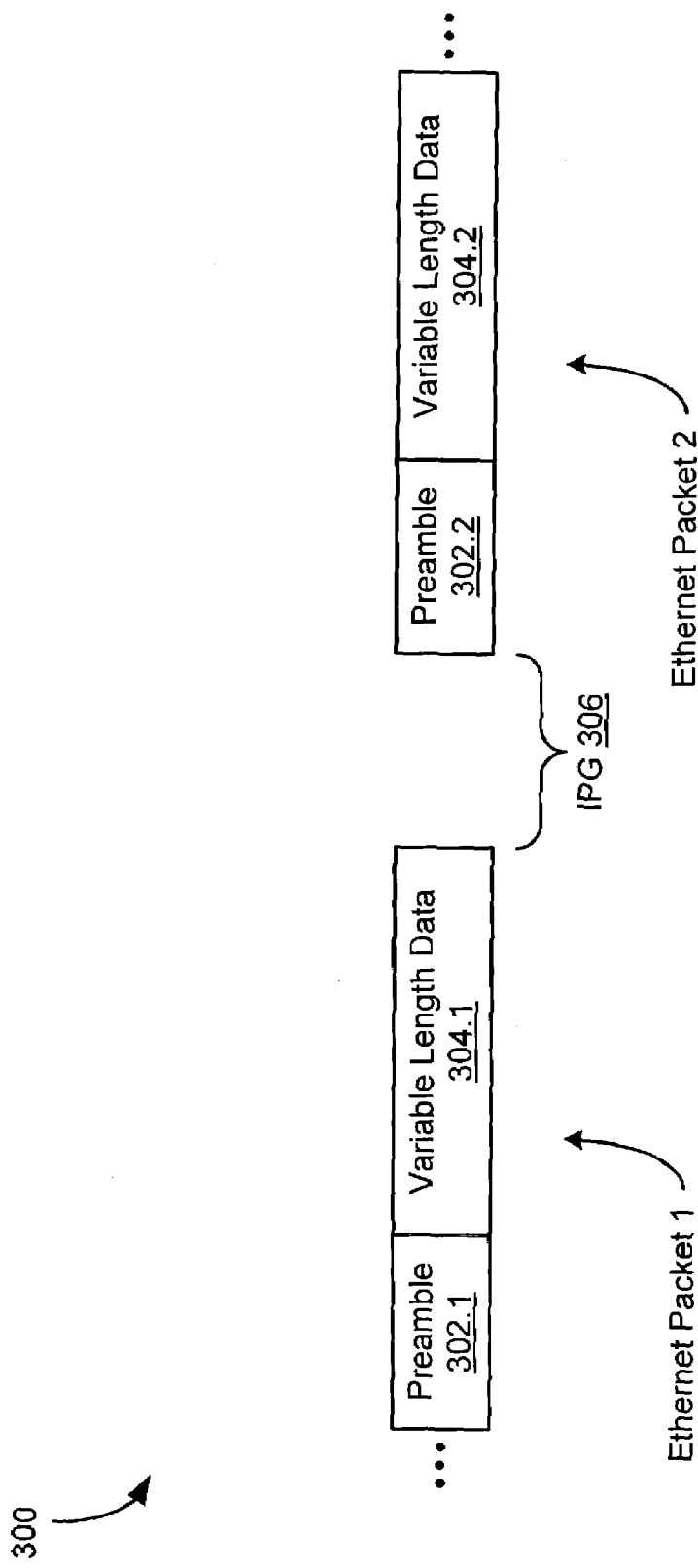
FIG. 3 is a block diagram illustrating the relationship between successive Ethernet packets in the data stream prior to being transported by the digital communications system of FIG. 1.

FIG. 3 depicts a stream 300 of Ethernet data packets 1-2 prior to being transported by the digital communications system 100 (see FIG. 1). As shown in FIG. 3, the Ethernet packet 1 begins with a preamble 302.1 followed by variable length packet data 304.1. Similarly, the Ethernet packet 2 begins with a preamble 302.2 followed by variable length packet data 304.2. It is understood that each one of the Ethernet packets 1-2 further comprises the hardware addresses (not shown) of the source and destination user devices A-B (see FIG. 1). FIG. 3 further depicts an Inter-Packet Gap (IPG) 306, which corresponds to the inter-frame period discussed above with reference to the XGMII 208 data stream (see FIG. 2).

In an illustrative mode of operation, the digital communications system 100 is configured (1) to perform 64 B/66 B decoding on the Ethernet LAN packets to recover the packet preamble and the variable length packet data, (2) to remove the IPG between successive packets in the data stream, (3) to encapsulate the packets using the Generic Framing Procedure (GFP) or any other suitable method of encapsulation, (4) to map the encapsulated packets to at least a portion of the overhead and payload areas of one or more ODUk frames, and (5) to transport the ODUk frames including the 10 GbE LAN data over the OTN network 102. In the preferred embodiment, the packets are GFP encapsulated, which results in the addition of an 8-byte GFP header to the packet. It is noted that 4 bytes of the 8-byte header may be employed for local/remote fault notification purposes.

Figure 4:
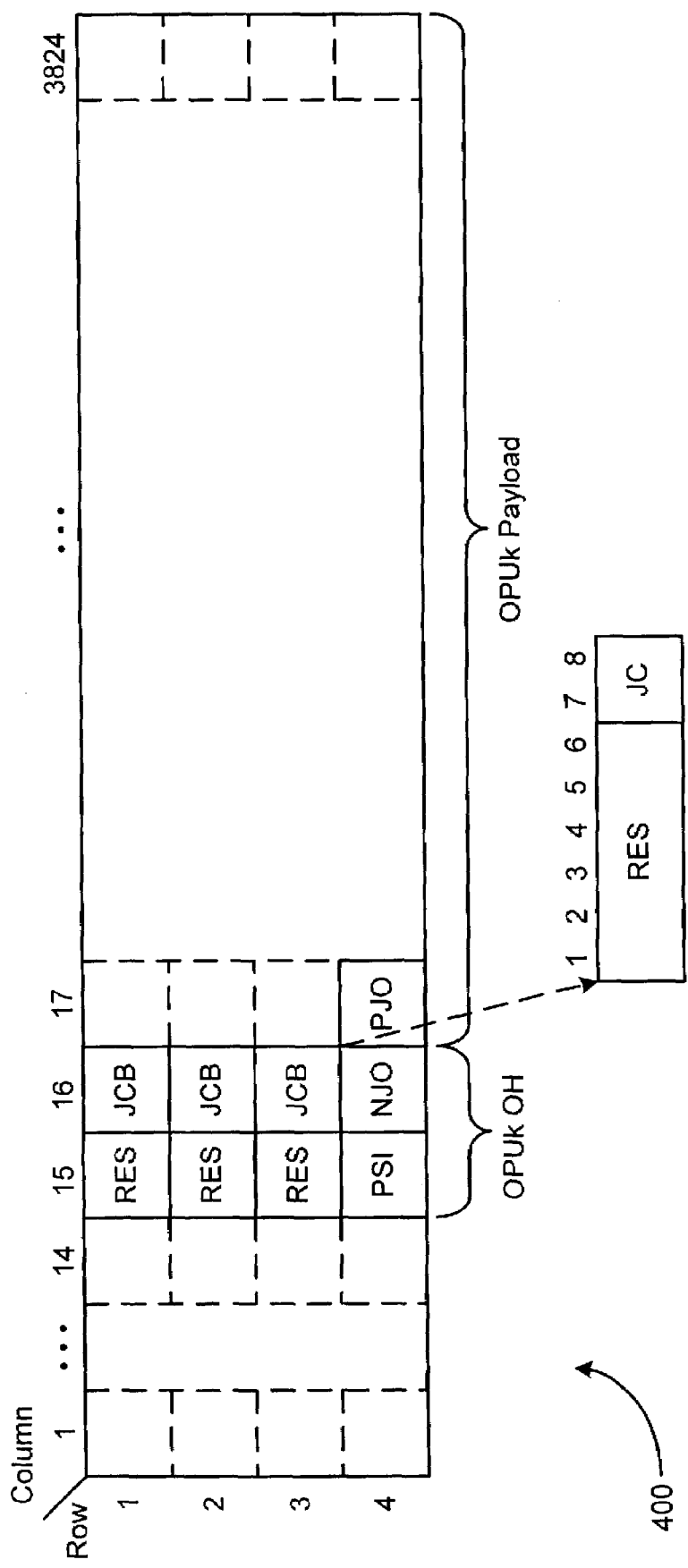
FIG. 4 is a diagram of a data frame structure employed by the digital communications system of FIG. 1.

FIG. 4 depicts an illustrative data frame structure 400 employed in the digital communications system 100 for transporting 10 GbE LAN data packets over the OTN network 102 (see FIG. 1). As shown in FIG. 4, the data frame structure 400 comprises the OPUk data frame structure, as defined in CCITT Recommendations G.709. It should be understood, however, that any suitable data frame structure may be employed. Specifically, the OPUk frame structure 400 has four rows and 3824 columns of bytes including a plurality of OPUk payload bytes disposed in columns 17-3824, and a plurality of OPUk overhead (OH) bytes disposed in columns 15-16. The OPUk overhead bytes include a Payload Structure Identifier (PSI), three Justification Control Bytes (JCB), a Negative Justification Opportunity (NJO) byte, and three additional bytes (RES) reserved for future international standardization. It is noted that the JCBs include the two bits for Justification Control (JC) and six bits (RES) reserved for future international standardization. The OPUk payload bytes comprise 4×3808 bytes including a Positive Justification Opportunity (PJO) byte.

As described above, the digital communications system 100 maps the GFP encapsulated packets to the overhead and payload areas of ODUk frames, i.e., the OPUk OH and payload byte areas. Because timing information does not need to be transferred with the Ethernet packets, the digital communications system 100 employs at least a portion of the OPUk OH bytes to transport data. In the preferred embodiment, the system 100 uses seven of the eight OPUk OH bytes to transport packet data over the OTN network 102, specifically, the three JCB (column 16), the NJO byte (column 16), and the three RES bytes (column 15). The PSI (column 15) is preserved to indicate the type of OPUk payload data.

As indicated above, the respective rates for the Ethernet interfaces A-B (see FIG. 1) are within the range 10.0000±100 ppm Gbit/s. In contrast, the data rate of an OPU2 payload is equal to 9.9953±20 ppm Gbit/s. By removing the IPG between successive Ethernet LAN packets and mapping the GFP encapsulated packets to the overhead and payload areas of the OPUk frame, the digital communications system 100 can transport the 10 GbE LAN signal over the OTN network at a data rate that is less than or equal to the OPU2 payload rate.

The operation of the digital communications system 100 (see FIG. 1) will be better understood with reference to the following analysis. As described above, the maximum 10 GbE LAN data rate is equal to 10.0000 Gbit/s+100 ppm, or 10.0010 Gbit/s. Further, only the PSI of the OPUk OH bytes is preserved. Accordingly, the minimum actual OPU2 data rate is calculated as follows—

$$\text{Standard } OPU2 \text{ rate}=(238/237)*(OC\text{-}192\text{-}20\,ppm) \quad (2)$$

$$\text{Rate expansion due to } OPUk\ OH=(7+3808*4)/(3808*4)*OPU2 \text{ rate} \quad (3)$$

$$\text{Minimum } OPU2 \text{ rate}=(15{,}239/15{,}232)*(238/237)(OC\text{-}192\text{-}20 \text{ PPM})=9.99967\ Gbit/s. \quad (4)$$

To recover the 10 GbE LAN packets at the far end, e.g., at the user device B, the digital communications system 100 employs Frame Mapped GFP to delineate the packets. This requires the removal of the IPG. To show that this will work, it is necessary to determine the minimum IPG. As indicated in clause 4.4.2 of IEEE 802.3ae, for 10 Gb/s implementations, the spacing between two packets (from the last bit of the FCS field of the first packet to the first bit of the preamble of the second packet) can have a minimum value of 40 BT (bit times), as measured at the XGMII receive signals at the DTE. This inter-FrameGap shrinkage may be caused by variable network delays and clock tolerances. As indicated in clause 46.2.1 of IEEE 802.3ae, the inter-frame period on an XGMII transmit or receive path is an interval during which no frame data activity occurs. The inter-frame corresponding to the MAC IPG begins with a Terminate control character, continues with Idle control characters, and ends with the Idle control character prior to a Start control character. The length of the IPG may be changed between the transmitting MAC and receiving MAC via one or more functions, e.g., RS lane alignment, PHY clock rate compensation or LOGBASE-W data rate adaptation functions. The minimum IPG at the XGMII of the receiving RS is five octets.

However, the scenario in which all packets are separated by 5 IPG bytes (i.e., 40 BTs) at 10 GbE+100 ppm normally cannot occur. The packets are usually separated by 9-15 bytes depending on how the bytes are aligned. As indicated in clause 46.3.1.4 of IEEE 802.3ae, the RS may maintain the effective data rate by sometimes inserting and sometimes deleting idle characters to align the Start control character. When using this method the RS maintains a Deficit Idle Count (DIC) that represents the cumulative count of idle characters deleted or inserted. The DIC is incremented for each idle character deleted, decremented for each idle character inserted, and the decision of whether to insert or delete idle characters is constrained by bounding the DIC to a minimum value of zero and maximum value of three. It is noted that this may result in inter-frame spacing observed on the transmit XGMII that is up to three octets shorter than the minimum transmitted inter-frame spacing specified in Clause 4 of IEEE 802.3ae. However, the frequency of shortened inter-frame spacing is constrained by the DIC rules. The DIC is only reset at initialization and is applied regardless of the size of the IPG transmitted by the MAC sub-layer. An equivalent technique may be employed to control RS alignment of the Start control character provided that the result is the same as if the RS implemented DIC.

To accommodate the frequency differences, 4 bytes may be added to/removed from the inter-frame spacing. As indicated in clause 49.2.4.7 of IEEE 802.3ae, idle control characters (/I/) are transmitted when idle control characters are received from the XGMII. Idle characters may be added or deleted by the PCS to adapt between clock rates. /I/ insertion and deletion shall occur in groups of 4. /I/'s may be added following idle or ordered sets. They shall not be added while data is being received. When deleting /I/'s, the first four characters after a /T/ shall not be deleted. Moreover, as indicated in clause 49.2.4.10 of IEEE 802.3ae, sequence-ordered sets may be deleted by the PCS to adapt between clock rates. Such deletion shall only occur when two consecutive sequence-ordered sets have been received and shall delete only one of the two. Only Idles may be inserted for clock compensation. Sequence-ordered sets are not deleted for clock compensation.

The worst case for minimum IPG occurs at the maximum packet size, which is currently 1512 bytes for Ethernet. However, larger Ethernet packet sizes, e.g., 9600 bytes, have been proposed. Accordingly, the time for the largest packet at 10 GbE±100 ppm is calculated as follows—

Maximum Packet Size=9600 bytes (5)

Average IPG=12 bytes (6)

Preamble=8 bytes. (7)

The minimum IPG occurs if a 10 GbE+100 ppm signal has to be translated to 10 GbE−100 ppm. The time for the largest packet at 10 GbE+100 ppm is expressed as $t_1 = (9600+12+8)/(10.0010\ G)$. (8)

The number of bytes "x" that have to be removed from the IPG to transmit the signal at 10 GbE−100 ppm is calculated as follows—

$t_1 = (9600+12+8-x)/(9.9990\ G)$ (9)

$x = [1-(9.9990\ G)/(10.0010\ G)]*(9600+12+8)$ (10)

$x = 1.94$. (11)

Because rate compensation is normally done in groups of 4 bytes, at an outgoing clock rate of 10 GbE−100 ppm, there may be an 8 byte IPG packet every other time. The average for the IPG is therefore 10 bytes, which is the worst-case long-term average for IPG.

The packet size during minimum IPG is expressed as 9600 bytes+8 byte preamble+10 byte *IPG*=9618 bytes. (12)

In the event the IPG is replaced by a GFP-F header of 8 bytes with no Frame Check Sequence (FCS), the effective data rate, i.e., the OPU2 payload rate, is calculated as follows—

10 *GbE LAN*−100 *ppm*=9.9990 *Gbit/s* (13)

Rate adjustment due to replacing 10 *IPG* bytes with 8 *GFP-F* bytes=(9600+8+8)/(9600+8+10) (14)

Corresponding *OPU*2 Payload Rate=9.9990 *G*\*(9600+8+8)/(9600+8+10)=9.9969 *Gbit/s*. (15)

It is noted that the OPU2 payload rate of 9.9969 Gbit/s, as indicated above in equation (15), is less than the payload rate when using the seven OPUk OH bytes, i.e., the three JCB, the NJO byte, and the three RES bytes. Accordingly, the digital communications system 100 is capable of successfully transporting this 10 GbE LAN signal over the OTN network 102 (see FIG. 1).

The OPU2 payload rate corresponding to the 10 GbE+100 ppm signal is calculated as follow—

Average IPG=12 bytes (16)

Corresponding *OPU*2 Payload Rate=10.0010 *G*\*(9600+8+8)/(9600+8+12)=9.9968 *Gbit/s*. (17)

The OPU2 payload rate of 9.9968 Gbit/s, as indicated above in equation (17), is less than the payload rate when using the seven OPUk OH bytes. Accordingly, the digital communications system 100 is also capable of successfully transporting this 10 GbE LAN signal over the OTN network 102 (see FIG. 1).

Figure 5:
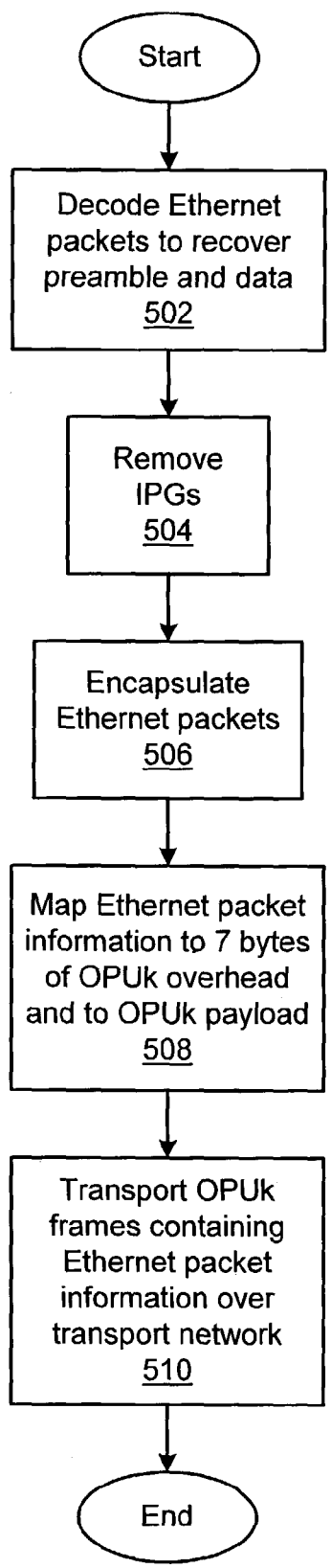
FIG. 5 is a flow diagram of a method of transporting 10 Gbit/s Ethernet LAN data packets over an optical transport network using the digital communications system of FIG. 1.

A method of transporting 10 GbE LAN data packets (10 Gbase-R) over a transport network using the presently disclosed high-capacity digital communications system is illustrated by reference to FIG. 5. As depicted in step 502, decoding (e.g., 64 B/66 B decoding) is performed on the 10 GbE LAN packets to recover the packet preamble and the variable length packet data. Next, the IPG is removed, as depicted in step 504, between successive packets in the packet data stream. The Ethernet packets are then encapsulated, as depicted in step 506, using GFP or any other suitable encapsulation method. Next, the packet information (including the preamble, data, and sequence-ordered set information) is mapped, as depicted in step 508, to 7 bytes of the OPUk overhead and to the bytes of the OPUk payload of one or more OPUk frames. Finally, the OPUk frames containing the packet information is transported, as depicted in step 510, over the transport network.

It will further be appreciated by those of ordinary skill in the art that modifications to and variations of the above-described 10 GbE LAN signal mapping to OTU2 signal may be made without departing from the inventive concepts disclosed herein. Accordingly, the invention should not be viewed as limited except as by the scope and spirit of the appended claims.

What is claimed is:

1. A method of transporting a stream of packets over a transport network using at least one OPUk frame, each packet including a preamble and packet data, each OPUk frame including an OPUk overhead (OH) area and an OPUk payload area, the method comprising the steps of:

in an accessing step, accessing at least the preamble and the packet data of each packet;

in a removing step, removing an inter-packet gap between successive packets in the stream of packets;

in an encapsulating step, encapsulating at least the preamble and the packet data of each packet;

in a mapping step, mapping at least the preamble and the packet data of each packet to at least one OPUk frame, wherein the mapping step includes mapping at least a portion of one or more of the preamble and the packet data of at least one packet to up to 7 bytes of the OPUk OH area of the at least one OPUk frame, and mapping at least a portion of one or more of the preamble and the packet data of at least one packet to at least a portion of the OPUk payload area of the at least one OPUk frame; and in a transporting step, transporting the at least one OPUk frame containing the preamble and the packet data of at least one packet over the transport network.

2. The method of claim 1 wherein the accessing step includes accessing at least the preamble and the data of each packet, each packet comprising a 10 Gbit/s Ethernet LAN packet.

3. The method of claim 2 wherein the accessing step further includes performing 64 B/66 B decoding on the packets to recover the preamble and the data of each packet.

4. The method of claim 2 wherein the accessing step further includes performing signaling via sequence-ordered sets.

5. The method of claim 1 wherein the encapsulating step includes encapsulating at least the preamble and the data of each packet using the Generic Framing Procedure (GFP)

6. The method of claim 5 wherein the encapsulating step further includes adding an 8-byte GFP header to each packet.

7. The method of claim 1 wherein the transporting step includes transporting the at least one OPUk frame containing the packet preamble and the packet data over the transport network, the transport network comprising an optical transport network.

8. The method of claim 1 wherein the transporting step includes transporting the at least one OPUk frame over the transport network at a data rate that is less than or equal to a payload rate of the OPUk frame.

9. A digital communications system configured to transport a stream of packets over a transport network using at least one OPUk frame, each packet including a preamble and packet data, each OPUk frame including an OPUk overhead (OH) area and an OPUk payload area, the system comprising:
  at least one source device;
  at least one optical transport network having a first Ethernet interface and a second Ethernet interface;
  the at least one optical transport network connected to the at least one source device via the first Ethernet interface;
  the at least one optical transport network connected to at least one destination device via the second Ethernet interface;
  wherein one or more of the at least one source device, the at least one optical transport network, and the at least one destination device are operative:
  to access at least the preamble and the packet data of each packet;
  to remove an inter-packet gap between successive packets in the stream of packets;
  to encapsulate at least the preamble and the packet data of each packet;
  to map at least the preamble and the packet data of each packet to at least one OPUk frame, including mapping at least a portion of one or more of the preamble and the packet data of at least one packet to up to 7 bytes of the OPUk OH area of the at least one OPUk frame, and mapping at least a portion of one or more of the preamble and the packet data of at least one packet to at least a portion of the OPUk payload area of the at least one OPUk frame; and
  to transport the at least one OPUk frame containing the preamble and the packet data of at least one packet over the transport network.

* * * * *

UNITED STATES PATENT AND TRADEMARK OFFICE
CERTIFICATE OF CORRECTION

PATENT NO. : 7,512,150 B2 Page 1 of 1
APPLICATION NO. : 10/395843
DATED : March 31, 2009
INVENTOR(S) : Timothy P. Walker It is certified that error appears in the above-identified patent and that said Letters Patent is hereby corrected as shown below:

Column 6, line 30, "LOGBASE-W" should read --10GBASE-W--.

Signed and Sealed this

Eighteenth Day of August, 2009

David J. Kappos
*Director of the United States Patent and Trademark Office*